United States Patent
Andrews

[15] 3,666,278
[45] May 30, 1972

[54] MACHINE TOOL FEED CHUCK

[72] Inventor: Earl C. Andrews, Breesport, N.Y.

[73] Assignee: Hardinge Brothers, Inc., Elmira, N.Y.

[22] Filed: Mar. 26, 1970

[21] Appl. No.: 22,889

[52] U.S. Cl. ................................................279/41, 279/96
[51] Int. Cl. ...........................................................B23b 31/12
[58] Field of Search.......................279/41, 42, 43, 46, 50, 51, 279/52, 53, 96, 102

[56] References Cited

UNITED STATES PATENTS

| | | | |
|---|---|---|---|
| 2,370,368 | 2/1945 | Martin | 279/50 |
| 1,450,189 | 4/1923 | Smith | 279/41 |

*Primary Examiner*—Andrew R. Juhasz
*Assistant Examiner*—James F. Coan
*Attorney*—Shlesinger, Arkwright & Garvey

[57] ABSTRACT

This invention is a machine tool feed chuck including a cylindrical body having a longitudinal bore through which a bar passes. The body is provided with opposed longitudinal slots forming leaves comprising jaws for holding the bar under tension. The leaves are urged toward each other at one end of the cylindrical body in order to obtain tension on the bar. In order to reduce the amount of deflection of the leaves between the working and inoperative positions, stop plugs are mounted in the leaves of the cylindrical body, the stop plugs extending across the slots into engagement with a portion of the opposite leaf, thereby preventing the leaves under tension from closing fully at the front end, and holding the chuck partially open when in the inoperative position.

7 Claims, 5 Drawing Figures

PATENTED MAY 30 1972  3,666,278
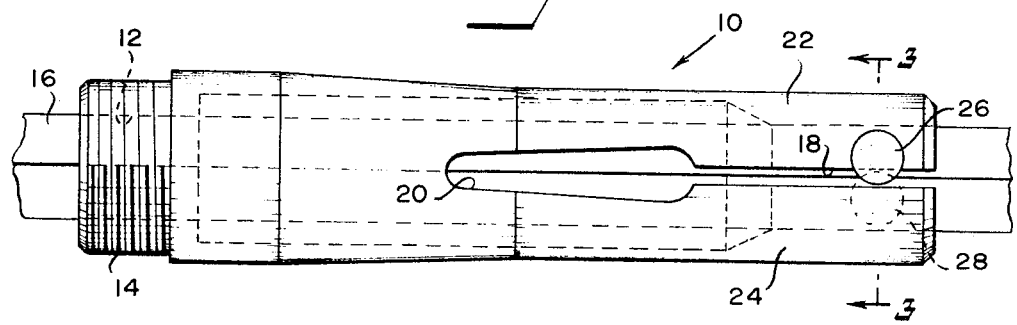
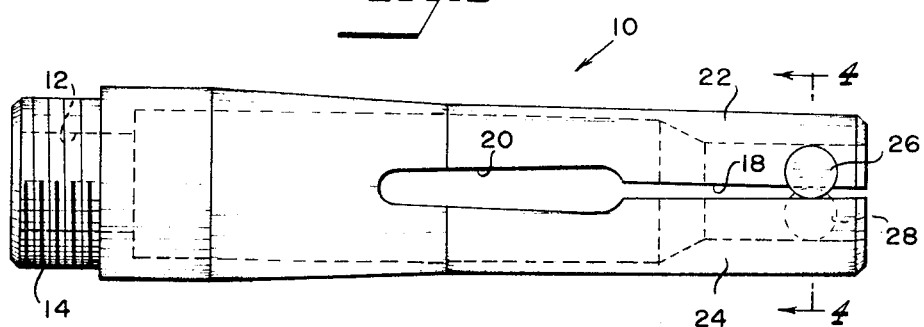
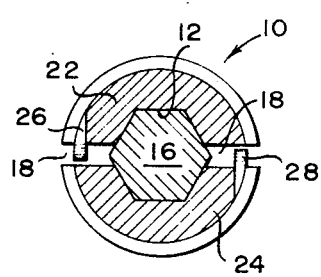
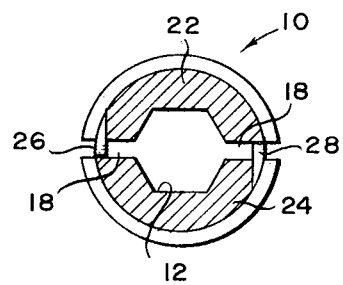
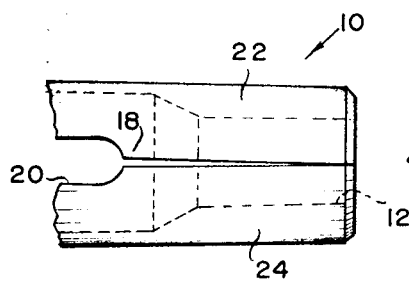
INVENTOR.
Earl C. Andrews
BY
Schlesinger, Arkwright & Garvey
ATTORNEYS ion, the device
MACHINE TOOL FEED CHUCK

BACKGROUND AND OBJECTS

Feed chucks for machine tools which are presently in use have a short life because of critical factors in their design over which there is little or no control. In order to feed long bars through the chuck, it is required that considerable tension be applied to the bars by the chuck jaws for proper operation. The tension is obtained on the chuck jaws by urging the jaws at the front of the chuck towards each other and heat treating while held in this position. When the bar is forced through the rear of the feed chuck, the chuck jaws are forced open and exert tension on the bar which is the force used for feeding. The wider the slots and the greater the distance the leaves are pulled down, the greater the tension exerted on the bar when it enters the chuck, but the greater the distance the jaws deflect between the inoperative and working positions.

Due to the high tensions required for feeding long bars, coupled with the thin walls on the feed chuck body at the high stress points, repeated opening and closing of the jaws causes the feed chuck to fracture after a relatively few bars have been loaded therein, causing loss of tension and rendering the chuck useless.

It is an object of the present invention to provide a feed chuck wherein wide slots are provided so that the chuck jaws can be drawn down to obtain the desired tension, but wherein difference in the distance the jaws deflect between the working and inoperative position is reduced, thereby decreasing the fatigue of the feed chuck, and resulting in longer life.

Another object is to provide a feed chuck of the character described which facilitates loading of the feed chuck by decreasing the deflection of the chuck jaws when in the inoperative position.

A further object is to provide a feed chuck including stop means for positively limiting the closure of the chuck jaws, thereby reducing the degree of deflection of the chuck jaws when in the inoperative position.

A still further object is to provide stop means which may be readily and easily applied to standard feed chucks in a minimum of time and at low cost.

Other objects will be apparent from the following presently preferred form of the present invention taken in conjunction with the appended drawings.

DESCRIPTION OF FIGURES OF DRAWING

FIG. 1 is a side elevational view of a feed chuck constructed in accordance with the present invention, illustrating the position of the jaws in working position;

FIG. 2 is a view similar to FIG. 1 illustrating the feed chuck of the present invention in the inoperative position;

FIG. 3 is a sectional view taken along the lines 3—3 of FIG. 1 looking in the direction of the arrows;

FIG. 4 is a sectional view taken along the lines 4—4 of FIG. 2, looking in the direction of the arrows; and FIG. 5 is a fragmentary side elevational view of a conventional type of feed chuck illustrating the normal deflection of the chuck jaws.

DESCRIPTION OF THE INVENTION

The feed chuck of the present invention generally includes a cylindrical body 10 having a longitudinal bore 12 which may be of any suitable conformation. The aft end of the cylindrical body is threaded at 14, which end of the chuck is adapted to receive a bar 16.

The forward end of the chuck is provided with longitudinal slots 18 in the peripheral wall of the cylindrical body, which extend from the forward terminal to a point intermediate the length of the body where they are enlarged to form generally elliptical recesses 20.

In the form of the invention illustrated, slots 18 are formed in diametrically opposed portions of the cylindrical wall, thereby forming leaves 22 and 24 which serve as jaws for engaging and holding bar 16 under tension. More than two leaves may be provided by the addition of longitudinal slots. Leaves 22 and 24 are deflected towards each other, as illustrated in FIG. 5, so that the width of slots 18 progressively decreases from the intermediate portion of the cylindrical body to the forward end thereof. In accordance with the objectives of the present invention, diametrically opposite portions of the outer peripheral wall of leaves 22 and 24 are milled out for the reception of circular stop plugs 26 and 28 which are adjacent the forward terminal of the feed chuck, and secured therein by adhesives or other suitable means.

As shown to advantage in FIG. 4, plugs 26 and 28 extend into slots 18 a predetermined distance and engage leaves 22 and for positively limiting the degree of deflection leaves 22 and 24.

It has been found that optimum results are obtained when plugs 26 and 28 contact the opposite face after the leaves have closed down approximately 25 percent of the amount they would close if the stops were not present. This allows the hole in the chuck to wear this amount before tension is lost and the chuck becomes ineffective. The outside edges of stop plugs 26 and 28 are ground flush with the outer diameter of the cylindrical body so that there will be no interference when the feed chuck, for example, is inserted into the hole of a collet.

OPERATION

In use of the feed chuck of the present invent is initially in the inoperative position illustrated in FIG. 2, at which time the deflected leaves 22 and 24 are maintained in spaced relationship by stop plugs 26 and 28. Bar 16 is then inserted through the longitudinal bore of the feed chuck at the aft end thereof and, upon movement through the cylindrical body spreads leaves 22 and 24, deflecting the latter to the position shown in FIG. 1.

By virtue of the device of the present invention, insertion of the bar in the feed chuck is facilitated since it is not necessary that the bar open the chuck to any great extent to insert the same therein. Nevertheless, it is held under the requisite tension within the feed chuck. This is especially important with hexagon bars, as illustrated in the drawing, since, if the bar happens to be across corners in the complemental bore of the feed chuck when the hole in the chuck is across flats, then it is easier felt and corrected by rotating the bar before inserting it in the chuck.

With the feed chuck of the present invention, the reduced deflection of the chuck jaws in the inoperative position results in less fatigue of the feed chuck, thereby substantially increasing the life thereof. Additionally, the stop plugs may be readily and easily installed on standard feed chucks at very small cost, the installation requiring very little time.

While there has been herein shown and described the use of disc-like stop plugs, it is to be understood that various other shapes and sizes may be employed if desired. In addition, this application is intended to cover any variations, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What I claim is:

1. A machine tool feed chuck for holding a bar, including:
   a. a cylindrical body having a longitudinal bore through which the bar passes,
   b. a plurality of longitudinal slots in said cylindrical body from one terminal of the body to a point spaced from the opposite terminal thereof, thereby providing leaves forming bar-retaining jaws,
   c. said leaves being deflected towards each other for exerting increased tension on the bar passed through the longitudinal bore of said cylindrical body,
   d. the deflection of said leaves resulting in the progressive reduction in the width of said slots from an intermediate portion of said cylindrical body to the forward end thereof, e. fixed stop means carried by at least one of said leaves proximate one terminal thereof in opposed relation to another leaf, f. portions of said stop means extending across said longitudinal slots into engagement with an adjacent leaf when no bar is within said cylindrical body, to limit the deflection of the leaves and the progressive decrease in width of the longitudinal slots, g. said portions of said stop means being in spaced relation to the adjacent leaf and the longitudinal slots being of substantially uniform width when a bar extends through the longitudinal bore of said cylindrical body, h. whereby greater tension is exerted on the bar with a minimum of deflection between the working and inoperative positions.

2. The feed chuck of claim 1, wherein:

a. each of said stop means includes a stop plug mounted in the wall of one of said leaves.

3. The feed chuck of claim 2, wherein:

a. said stop plug engages the opposed leaf after the leaves have closed down approximately 25 percent of the amount they would close if the plug were not present.

4. The feed chuck of claim 3, wherein:

a. said stop plug is of round conformation.

5. A machine tool feed chuck, for holding a bar, including:

a. a cylindrical body having a longitudinal bore through which the bar passes, b. longitudinal slots in diametrically opposed portions of said cylindrical body, c. the longitudinal slots extending from one terminal of the body to a point spaced from the opposite terminal thereof, thereby providing leaves forming bar-retaining jaws, d. said leaves being deflected towards each other for exerting increased tension on the bar passing through the longitudinal bore of said cylindrical body, e. the deflection of said leaves resulting in the progressive reduction in the width of said slots from an intermediate portion of said cylindrical body to the forward end thereof, f. fixed stop means carried by at least one of said leaves proximate one terminal thereof in opposed relationship to said other leaf, g. portions of said stop means extending across said longitudinal slots into engagement with an adjacent leaf when no bar is within said cylindrical body, to limit the deflection of the leaves and the progressive decrease in width of the longitudinal slots, h. said portions of said stop means being in spaced relation to the adjacent leaf and the longitudinal slots being of substantially uniform width, when a bar extends through the longitudinal bore of said cylindrical body, i. whereby greater tension is exerted on the bar with a minimum of deflection between the working and inoperative positions.

6. The feed chuck of claim 5, wherein:

a. each of said leaves is milled out proximate the forward terminal thereof, and b. said stop means comprise round plugs mounted in the milled out portions of the leaves.

7. The feed chuck of claim 5, wherein:

a. said plug engages the opposed leaf after the leaves have closed down approximately 25 percent of the amount they would close if the plug were not present.

* * * * *